No. 748,976. PATENTED JAN. 5, 1904.
T. NICHOLS.
HOLDBACK FOR BREECHING STRAPS.
APPLICATION FILED SEPT. 12, 1903.
NO MODEL.
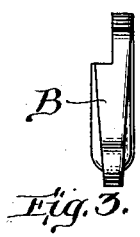
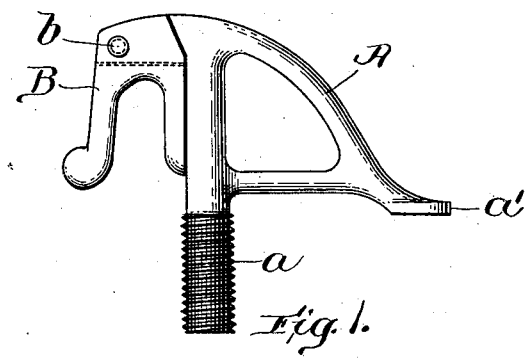
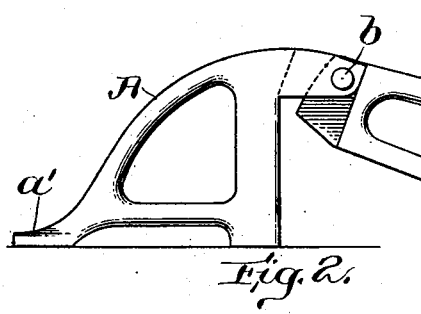
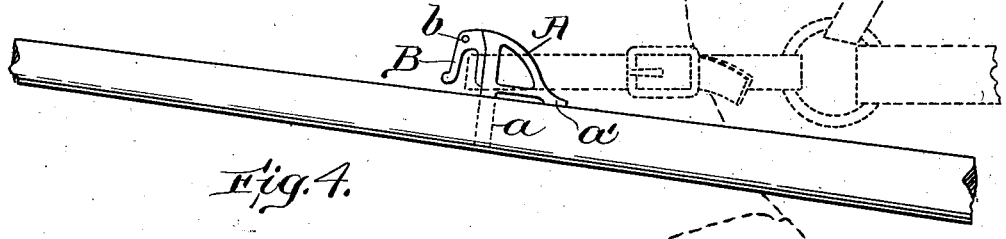
Witnesses:
C. B. Maynadier
Arthur F. Randall
Inventor:
Thomas Nichols,
by Maynadier & Rockwell,
Attorneys.

No. 748,976. Patented January 5, 1904.

UNITED STATES PATENT OFFICE.

THOMAS NICHOLS, OF TEMPLETON, MASSACHUSETTS, ASSIGNOR OF ONE-HALF TO IRVING G. WAITE, OF BALDWINVILLE, MASSACHUSETTS.

HOLDBACK FOR BREECHING-STRAPS.

SPECIFICATION forming part of Letters Patent No. 748,976, dated January 5, 1904.

Application filed September 12, 1903. Serial No. 172,997. (No model.)

*To all whom it may concern:*

Be it known that I, THOMAS NICHOLS, of Templeton, in the county of Worcester and State of Massachusetts, have invented an Improved Holder for Breeching-Straps, of which the following is a specification, reference being had to the accompanying drawings, making a part hereof.

Many accidents occur by reason of the breeching-straps being so hooked to the shafts that the breeching-straps will not become freed in case the horse starts forward in the shafts when the traces are freed by design or by accident, as the breaking of the whiffletree or the traces; and the purpose of my invention is to provide a breeching-strap holder such that while a secure connection between the breeching-strap and the shaft is afforded when the breeching-strap is strained in one direction, yet the breeching-strap is drawn clear of the holder by a strain in the opposite direction. This I accomplish by the holder shown in the drawings, in which—

Figure 1 is an elevation of one side of my holder. Fig. 2 is the other side elevation. Fig. 3 is an edge view of a movable hook which is the new feature of my holder when used with the stationary portion fast to the shaft. Fig. 4 illustrates one of my holders in place on a shaft with a portion of the breeching-strap shown in dotted lines.

My holder consists of the bracket A with a screw-tang $a$, by which and by a screw through the arm $a'$ the bracket is secured to the shaft to the upper side, as shown in Fig. 4, or to the lower side, as is often the case, it being common to use holders for breeching-straps above or below the shaft to suit the vehicle and harness, as is well known. This bracket A has a lip at one side of its post, as clearly shown in Figs. 1, 2, and 4, and the hook B has a like side lip projecting from its head, as clearly shown in Fig. 3, and these two side lips are connected by the pintle $b$, so that the hook and bracket when in use may be brought into position shown in Figs. 1 and 4 or into the position shown in Fig. 2 by the appropriate movement of the holdback-strap. (Shown in dotted lines in Fig. 4.) This is the main feature of my invention, although it is essential that the side lips project far enough to allow the two jaws of hook B to come into substantially the relations shown with the pintle $b$ in Figs. 1 and 2 and so that the weight of hook B shall tend to hold hook B close to the post of bracket A whether the holder be on the upper or on the under side of the shaft. It is also of great practical importance that these two side lips be used, one on the bracket, the other on the hook, as their use in substantially the relation shown with pintle $b$ materially decreases the cost and greatly facilitates the proper fitting of the two parts together, it being well known that the pintle should cause sufficient friction between the hook and the bracket to prevent unnecessary oscillations of the hook.

In hitching up the loop of the breeching-strap may be inserted in the hook B in the ordinary manner, or the hook B may be swung forward, as in Fig. 2, and the loop of the strap then inserted in hook B, when the weight of the strap will bring the hook to the position shown in Figs. 1 and 2, while in unhitching or in case the horse clears himself from the shafts strain on the breeching-strap will swing hook B into position to clear the strap from the shafts.

I am aware of Patents No. 48,513, dated July 4, 1865, to E. Brown, and No. 206,221, dated July 23, 1878, to O. Brothers, Jr., and disclaim all shown in them.

What I claim as my invention is—

The improved holder for breeching-straps comprising bracket A, with means for attaching it to the shaft, and a side lip projecting from its front post; hook B, with a corresponding side lip on its cross-piece; and pintle $b$ holding the flat side of the two lips together, substantially as described.

THOMAS NICHOLS.

Witnesses:
MYRON W. HOWARD,
C. C. SPEARE.